United States Patent [19]

Miyaoh

[11] Patent Number: 5,078,413
[45] Date of Patent: Jan. 7, 1992

[54] STEEL LAMINATE GASKET WITH MAIN AND AUXILIARY SEALING DEVICES

[75] Inventor: Yoshio Miyaoh, Tokyo, Japan

[73] Assignee: Ishikawa Gasket Co., Ltd., Tokyo, Japan

[21] Appl. No.: 617,039

[22] Filed: Nov. 23, 1990

[30] Foreign Application Priority Data

Nov. 29, 1989 [JP] Japan .................. 1-137302[U]

[51] Int. Cl.$^5$ ............................................. F16J 15/08
[52] U.S. Cl. .............................. 277/235 B; 277/236
[58] Field of Search .............. 277/235 B, 232, 234, 277/236

[56] References Cited

U.S. PATENT DOCUMENTS

| | | | |
|---|---|---|---|
| 2,711,334 | 6/1955 | Balfe | 277/235 B |
| 4,203,608 | 5/1980 | Nicholson | 277/235 B |
| 4,254,963 | 3/1981 | Skrycki | 277/235 B |
| 4,311,318 | 1/1982 | Czernik et al. | 277/235 B |
| 4,400,000 | 8/1983 | Moerk, Jr. | 277/235 B |
| 4,739,999 | 4/1988 | Ishii et al. | 277/235 B |
| 4,759,556 | 7/1988 | Udagawa | 277/235 B |
| 4,791,897 | 12/1988 | Udagawa | 277/235 B |
| 4,803,965 | 2/1989 | Udagawa et al. | 277/235 B |
| 4,809,653 | 3/1989 | Udagawa et al. | 277/235 B |
| 4,815,750 | 3/1989 | Yoshino | 277/235 B |
| 4,861,046 | 8/1989 | Udagawa et al. | 277/235 B |

FOREIGN PATENT DOCUMENTS

| | | | |
|---|---|---|---|
| 0090745 | 5/1984 | Japan | 277/235 B |
| 0162037 | 8/1985 | Japan | 277/235 B |
| 61-255254 | 12/1986 | Japan . | |
| 0143369 | 6/1988 | Japan | 277/235 B |
| 1114200 | 5/1968 | United Kingdom . | |
| 2073335 | 10/1981 | United Kingdom | 277/235 B |

OTHER PUBLICATIONS

Takahashi, Japanese Abstract 61-160549, 7/86.

Primary Examiner—William A. Cuchlinski, Jr.
Assistant Examiner—Daniel G. DePumpo
Attorney, Agent, or Firm—Kanesaka and Takeuchi

[57] ABSTRACT

The gasket of the invention is installed in an internal combustion engine having at least one cylinder bore and auxiliary combustion chamber. The gasket comprises first, second and third plates. The first plate includes a curved portion to define a hole for the cylinder bore and a flange extending away from the hole. The second plate is situated under the first plate, and the third plate is located under the second plate. The gasket further includes at least one main sealing device situated adjacent the curved portion, and an auxiliary bead formed on one of the first, second and third plates. The auxiliary bead surrounds the main bead and a portion corresponding to the mouth plate so that gas does not leak outside the auxiliary bead.

7 Claims, 1 Drawing Sheet

STEEL LAMINATE GASKET WITH MAIN AND AUXILIARY SEALING DEVICES

BACKGROUND OF THE INVENTION AND RELATED ART STATEMENT

The present invention relates to a steel laminate gasket for an internal combustion engine with auxiliary combustion chambers as well as cylinder bores to prevent leakage of gas from the cylinder bores and the auxiliary combustion chambers.

One example (prior art) of an engine with an auxiliary combustion chamber and a steel laminate gasket therefor is shown in FIGS. 1 and 2. In this engine, a cylinder head H is provided with an auxiliary combustion chamber M, to which a mouth plate L is attached to define the auxiliary combustion chamber M. A gasket 10 is installed between a cylinder block J and the cylinder head H with a part of the mouth plate L.

In this engine, since only a part of the mouth plate L is supported by the gasket 10 on the cylinder block J, when the engine is operated, the mouth plate L is liable to move. As a result, combustion gas from the cylinder bore is also liable to leak, especially from points N, N' where an outer portion of the mouth plate L contacts an inner surface of the cylinder bore Hc.

In order to prevent leakage from the cylinder bore Hc, there have been proposed various methods.

In the gasket 10 as shown in FIGS. 1 and 2, the gasket 10 includes cylinder bores Hc, water holes Hw, oil holes Ho, push rod holes Hp and bolt holes Hb. The gasket 10 is formed of plates 11, 12, 13, 14, 15, and a wire ring 16. The plate 11 has a curved portion 11a around the cylinder bore Hc, and a flange 11b situated outside the plate 15. The plate 12 includes a bead 12a around the cylinder bore Hc, and a bead 12b outside a counter portion P corresponding to the mouth plate L. The wire ring 16 is situated adjacent to the curved portion 11a to surround the cylinder bore Hc.

In the gasket 10, the beads 12a, 12b are formed outside the cylinder bore Hc and the counter portion P. However, when the mouth plate L is slightly moved, combustion gas may leak through the beads 12a, 12b.

In U.S. Pat Nos. 4,791,897, 4,803,965 and 4,809,653, additional beads are further provided, such as beads outside connecting or intersecting points of the beads 12a, 12b, with one or more bead located inside the counter portion P. Height and orientation of the beads may also be changed.

The gaskets as proposed in these patents substantially prevent leakage of combustion gas from the cylinder bores. However, in case compression ratio is extremely high or the mouth plate L is liable to move, the gaskets as proposed in the patents do not operate as intended.

On the other hand, Japanese Patent Publication (KOKAI) No. 61-255254 proposed a gasket having an outer bead in the form of a step to provide tightening pressure equally on all beads and to improve sealing ability. Since the outer bead or step is formed along an outer edge of a gasket, if leakage happens at a high pressure portion, the outer bead can not stop leakage.

The present invention has been made in view of the above prior art.

One object of the present invention is to provide a steel laminate gasket, which can tightly seal around a cylinder bore with an auxiliary combustion chamber.

Another object of the invention is to provide a steel laminate gasket as stated above, wherein even if leakage occurs at main sealing means, the leakage is sufficiently prevented.

A further object of the invention is to provide a steel laminate gasket as stated above, wherein the gasket can be easily and economically manufactured.

Further objects and advantages of the invention will be apparent from the following description of the invention.

SUMMARY OF THE INVENTION

A steel laminate gasket is installed in an internal combustion engine with at least one auxiliary combustion chamber. Namely, the engine includes a cylinder head with the auxiliary combustion chamber therein, a cylinder block with at least one cylinder bore, and at least one mouth plate attached to the cylinder head to define the auxiliary combustion chamber.

The gasket comprises first, second and third plates. The first plate includes a base portion, a curved portion extending from the base portion to define a hole corresponding to the cylinder bore, and a flange extending from the curved portion in the direction away from the cylinder bore.

The second plate is located under the base portion of the first plate, and the third plate is located under the second plate. The third plate includes an end portion, which is situated between the base portion and the flange.

The gasket further includes at least one main sealing means situated between the base portion and the flange to securely seal around the cylinder bore, and an auxiliary bead formed on one of the first, second and third plates. The auxiliary bead is located outside the main sealing means and a part of a counter portion corresponding to the mouth plate. Namely, the auxiliary bead is arranged to completely surround the cylinder bore and the counter portion beneath the mouth plate without having any other holes inside the auxiliary bead.

Accordingly, even if combustion gas leaks beyond the main sealing means, the combustion gas is sufficiently prevented by the auxiliary bead. Since the points N, N' where the mouth plate L contacts the inner surface of the cylinder bore Hc are located inside the auxiliary bead, even if the mouth plate L slightly moves, leakage does not occur.

The main sealing means may be a main bead formed on one of the first, second and third plates. Preferably, the auxiliary bead is formed on the same plate as the main bead. In this case, the main bead and auxiliary bead extend in the opposite directions, respectively.

In case the cylinder bores are arranged side by side to have a narrow portion therebetween, each auxiliary bead which surrounds the cylinder bore and the counter portion is joined at the narrow portion to form a common portion. The auxiliary beads can sufficiently seal around the cylinder bores.

DETAILED DESCRIPTION OF PREFERRED EMBODIMENT

Figure 2:
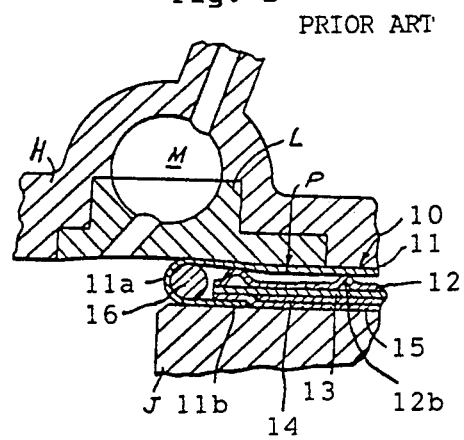
FIG. 2 is an explanatory section view for showing a condition that the gasket as shown in FIG. 1 is installed in an engine with an auxiliary combustion chamber.
Figure 3:
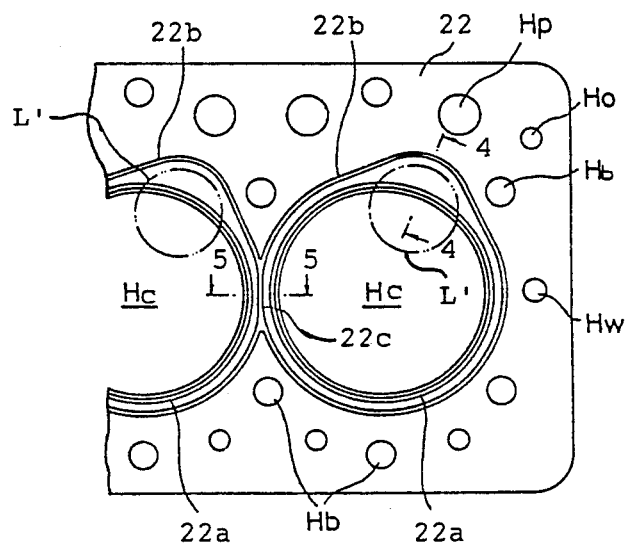
FIG. 3 is an explanatory plan view of a part of a middle plate of a gasket of the present invention.
Figure 4:
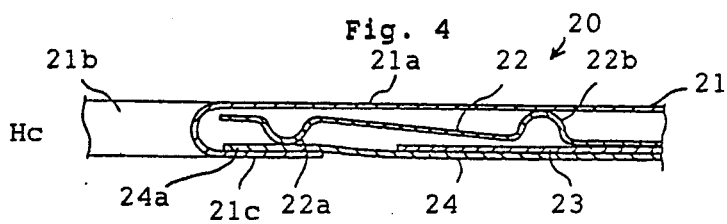
FIG. 4 is an enlarged section view of a gasket of the invention taken along line 4—4 in FIG. 3.
Figure 5:
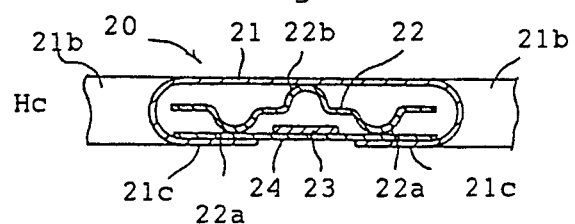
FIG. 5 is an enlarged section view of a gasket of the invention taken along line 5—5 in FIG. 3.

Referring to FIGS. 3-5, one embodiment 20 of the gasket of the present invention is shown. The gasket 20 is designed to be installed in an engine having a cylinder head H with an auxiliary combustion chamber M, a cylinder block J, and a mouth plate L attached to the cylinder head H, as in the engine shown in FIG. 2.

As shown in FIG. 3, the gasket 20 includes a plurality of cylinder bores Hc, water holes Hw, oil holes Ho, bolt holes Hb and push rod holes Hp, as in the conventional gasket. Since the present invention is directed to a sealing mechanism around the cylinder bores Hc with auxiliary combustion chambers M, other sealing mechanisms around the water hole Hw, oil hole Ho and so on are omitted in FIG. 3. Any sealing mechanisms may be used for sealing around the water holes Hw, oil holes Ho and so on.

As shown in FIGS. 4 and 5, the gasket 20 comprises an upper plate 21, middle plates 22, 23, and a lower plate 24. The upper plate 21 extends substantially the entire area of the gasket 20. The upper plate 21 includes a base portion 21a, a curved portion 21b extending downwardly from the base portion 21a to surround the cylinder bore Hc and a flange 21c extending from the curved portion 21b in the direction away from the cylinder bore Hc.

The middle plate 22 is situated under the base portion 21a and extends substantially the entire area of the gasket 20. The middle plate 22 is provided with main beads 22a extending toward the lower plate 24, and auxiliary beads 22b extending toward the upper plate 21. The main beads 22a surround the respective cylinder bores Hc, while the auxiliary beads 22b are situated outside the main beads 22a to surround the same widely.

As explained before, the gasket 20 supports the mouth plate L underside thereof. In this respect, since the main bead 22a is situated adjacent to the cylinder bore Hc, the main bead 22a crosses underside the mouth plate L to support the same. On the other hand, the auxiliary bead 22b located outside the main bead 22a surrounds a portion L' corresponding to the mouth plate L. Namely, the auxiliary bead 22b is not situated under the mouth plate L.

Figure 1:
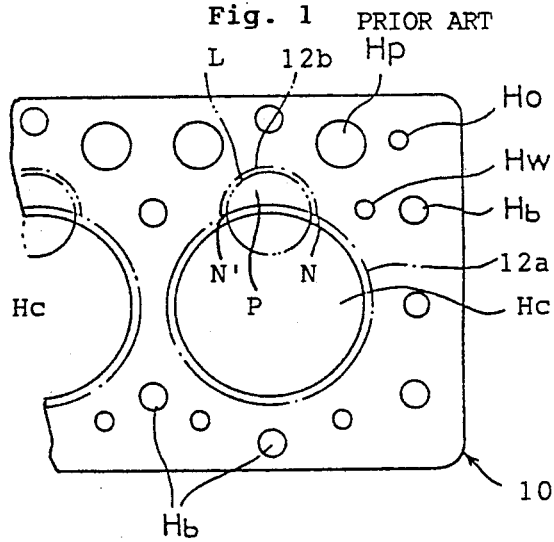
FIG. 1 is a plan view of a part of a conventional gasket.

The auxiliary bead 22b completely surrounds the main bead 22a and the portion L, especially the points N, N' as shown in FIG. 1 from which combustion gas is liable to leak. Therefore, even if the mouth plate L slightly moves in operation and gas leaks from the points N, N', the auxiliary bead 22b can properly seal to prevent leakage outwardly.

The engine on which the gasket 20 is installed has cylinder bores Hc closely arranged to each other. Therefore, there is no sufficient space to independently form two auxiliary beads 22b between the cylinder bores Hc. Therefore, as shown in FIG. 3, the adjacent auxiliary beads 22b are combined together to form a common portion 22c between the cylinder bores Hc. The respective auxiliary beads 22b with the common portion 22c can securely seal around the main bead 22a. In case there is enough space to form the auxiliary beads 22b independently, it is unnecessary to form the common portion 22c.

In the present invention, the main bead 22a and the auxiliary bead 22b extend in the opposite directions. Acute or high surface pressure is generally formed at a side that a bead projects. In the present invention, since the main bead 22a and the auxiliary bead 22b extend in different directions, acute or high surface pressure of the two beads 22a, 22b orients in the different directions. Therefore, high surface pressure for sealing between the cylinder head and cylinder block is oriented in different directions to properly seal therebetween.

The middle plate 23 is located under the middle plate 22, and does not overlap the flange 21c. On the other hand, the lower plate 24 is situated under the middle plate 23 and has an edge portion 24a situated above the flange 21c. Since the middle plate 23 does not overlap the flange 21c, the middle plate 23 operates as a surface pressure regulation plate.

The flange 21c and the edge portion 24a overlap with each other, and the main bead 22a is situated above the flange 21c and the edge portion 24a. Therefore, an area around the cylinder bore Hc is sufficiently sealed. Even if combustion gas is leaked, the gas does not enter between the upper and lower plates 21, 24.

In the gasket 20, there is no sealing bead around the portion L'. However, it is possible to provide sealing beads on and around the portion L' within the auxiliary bead 22b. Further, as shown in FIG. 2, a wire ring 16 may be incorporated into the gasket 20 to seal around the cylinder bore Hc. In this case, the wire ring is located inside the main bead 22a.

In the present invention, an auxiliary bead is situated to surround a main sealing bead of the cylinder bore and a portion corresponding to the mouth plate. There is no hole except the cylinder bore inside the auxiliary bead. Therefore, even if the mouth plate is slightly moved to cause leakage around the mouth plate, leaked gas is sufficiently prevented to spread outwardly by the auxiliary bead. As a result, leakage is effectively blocked.

While the present invention has been explained with reference to the specific embodiment of the invention, the explanation is illustrative, and the invention is limited only by the appended claims.

What is claimed is:

1. A steel laminate gasket for an internal combustion engine with at least one auxiliary combustion chamber, said engine having a cylinder head with the auxiliary combustion chamber, a cylinder block with at least one cylinder bore, and at least one mouth plate attached to the cylinder head to define the auxiliary combustion chamber, said gasket comprising,
    a first plate having a base portion, at least one first hole corresponding to the cylinder bore, a curved portion extending outwardly from the base portion to define the first hole, and a flange extending from the curved portion in the direction away from the first hole,
    at least one second plate situated under the base portion of the first plate and having at least one second hole larger than the first hole so that the curved portion is located inside the second hole when assembled together,
    a third plate situated under the second plate, said third plate having a third hole larger than the first hole, and an end portion around the third hole, said end portion being situated between the base portion and the flange,
    at lest one main bead formed on one of the first, second and third plates to surround the cylinder bore, said main bead extending outwardly in one direction from one of the first, second and third plates and being situated between the base portion and the flange to securely seal around the cylinder bore when the gasket is tightened, and an auxiliary bead formed on one of the first, second and third plates where the main bead is formed, said auxiliary bead being located outside the main bead and a portion on which a part of the mouth plate is located, said auxiliary bead extending in a direction opposite to a direction that the main bead extends to completely surround the same without having any other hole except the cylinder bore inside thereof so that gas does not leak outside the auxiliary bead.

2. A steel laminate gasket according to claim 1, wherein said auxiliary bead and main bead are formed on the second plate.

3. A steel laminate gasket according to claim 2, wherein said main bead is located above the flange and the end portion of the third plate.

4. A steel laminate gasket according to claim 3, further comprising a fourth plate situated between the second and third plates and having a hole therein so that the fourth plate does not overlap the flange.

5. A steel laminate gasket according to claim 2, wherein a plurality of cylinder bores, auxiliary combustion chambers and mouth plates is arranged side by side to have a narrow portion between the cylinder bores, each auxiliary bead which surrounds the cylinder bore and the portion on which a part of the mouth plate is located joining at the narrow portion to form a common portion of the auxiliary bead.

6. A steel laminate gasket for an internal combustion engine with a plurality of auxiliary combustion chambers, said engine including a cylinder head with the auxiliary combustion chambers, a cylinder block with a plurality of cylinder bores, and a plurality of mouth plates attached to the cylinder head to define the auxiliary combustion chambers, said gasket comprising, a first plate having a base portion, a plurality of first holes corresponding to the cylinder bores, curved portions extending outwardly from the base portion to define respective first holes, and flanges extending from the respective curved portions in the direction away from the first holes, at least one second plate situated under the base portion of the first plate and having a plurality of second holes larger than the first holes so that the curved portions are located inside the second holes when assembled together, a third plate situated under the second plate, said third plate having third holes larger than the first hole, and end portions around the respective third holes, each end portion being situated between the base portion and the flange, a plurality of main beads formed on one of the first, second and third plates to surround the respective cylinder bores, said main beads extending outwardly in one direction from one of the first, second and third plates and being respectively situated between the base portion and the flange to securely seal around the cylinder bores when the gasket is tightened, and a plurality of auxiliary beads formed on one of the first, second and third plates where the main beads are formed, each auxiliary bead being located outside one main bead and one portion on which a part of the mouth plate is located, said auxiliary beads extending in directions opposite to directions that the main beads extend, each auxiliary bead completely surrounding said one bead and said one portion without having any other hole except the cylinder bore inside thereof so that gas does not leak outside the auxiliary bead, each auxiliary bead which surrounds the cylinder bore and the portion on which a part of the mouth plate is located joining together at the narrow portion between the adjacent cylinder bores to form a common portion of the auxiliary bead.

7. A steel laminate gasket according to claim 5, further comprising a fourth plate located at a side opposite to the auxiliary bead and between the main beads, said fourth plate supporting the auxiliary bead without overlapping the main beads.

* * * * *